Aug. 28, 1962 W. E. McCOWN ET AL 3,051,858
MAGNETIC COUPLING
Filed Dec. 17, 1957 2 Sheets-Sheet 2
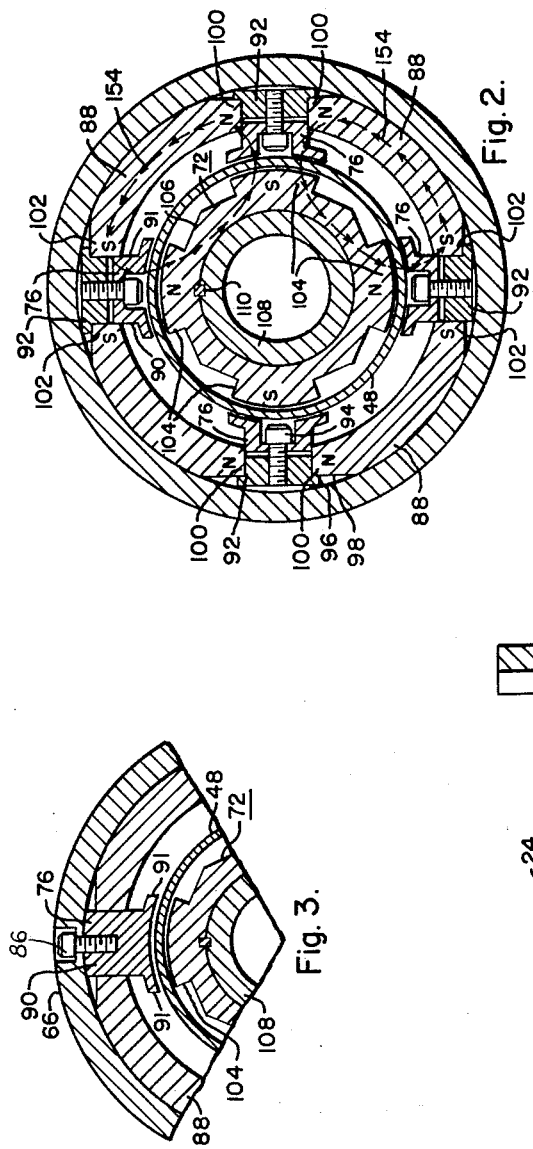
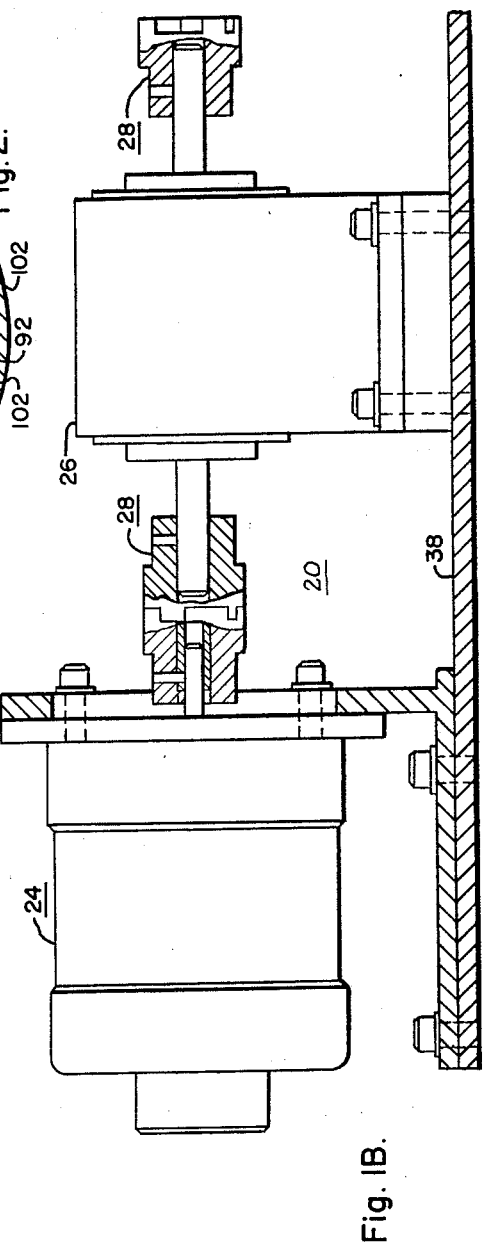
WITNESSES:
Bernard R. Ginguay
INVENTORS
William E. McCown and
Dikran A. Guerdan.
BY
Donald D. Smith
ATTORNEY United States Patent Office 3,051,858
Patented Aug. 28, 1962

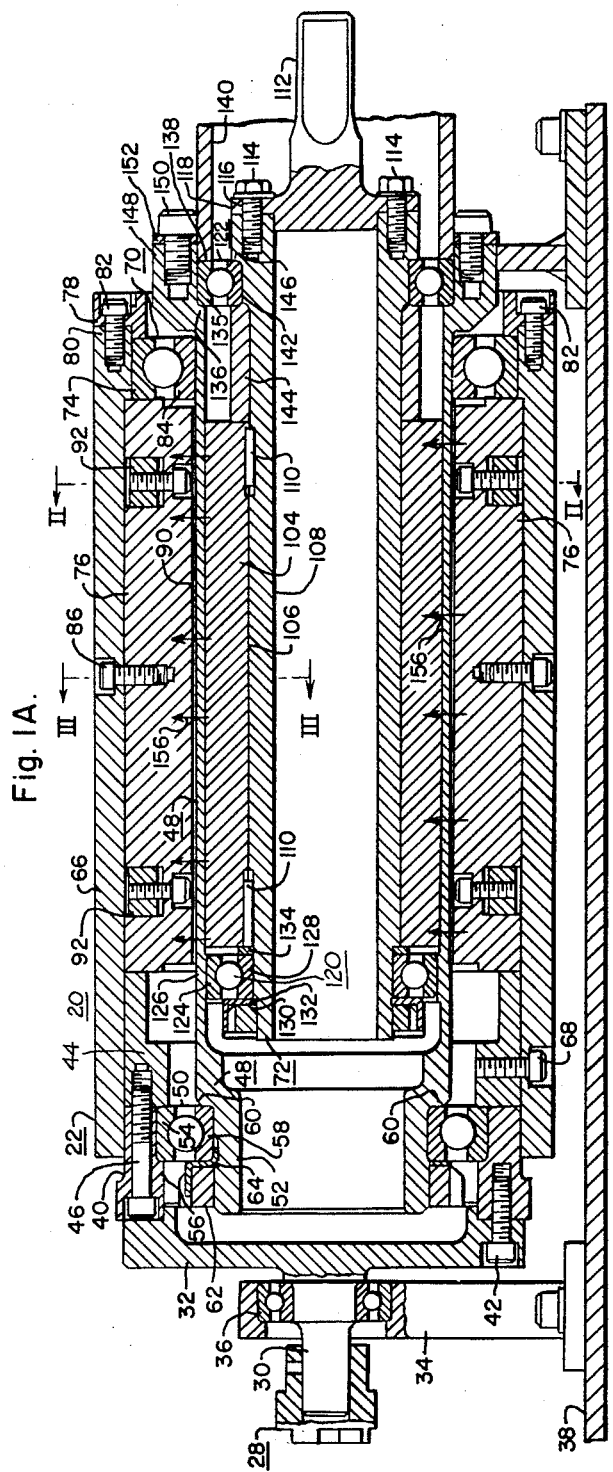

3,051,858
MAGNETIC COUPLING
William E. McCown, Mount Lebanon, and Dikran A. Guerdan, Pittsburgh, Pa., assignors to Westinghouse Electric Company, East Pittsburgh, Pa., a corporation of Pennsylvania
Filed Dec. 17, 1957, Ser. No. 703,402
6 Claims. (Cl. 310—104)

The present invention relates to a magnetic coupling arrangement, and particularly to one wherein the driven component is adapted for sealing within an enclosed system.

There are many applications wherein it is desired to drive a movable component such as a pump impeller, a mixing agitator, the rotor of a telemetering device, or a lead screw for actuating a valve or other element arranged for controlling a system. These driven components frequently are sealed within a system in which the characteristic of zero leakage therefrom is specified. When handling certain hazardous fluids, for example, it is essential to avoid any possible contact therewith by operating personnel. In such arrangements, it is virtually impossible to extend a driving shaft or the like into the system due to the inevitable leakage, although slight, characteristic of various sealing arrangements or packing glands or the like, particularly after being subjected to a period of wear. The problem of driving a component which is hermetically sealed within the system is complicated still further in those applications wherein the system is maintained at extremely high pressures or is comprised of highly corrosive or erosive fluids which, of course, greatly accelerate the wear and deterioration to which the aforementioned sealing arrangements are vulnerable.

In the aforementioned applications, mechanical coupling can be avoided between the driving and driven components by fabricating these components from magnetic materials and by providing at least one of these components with a permanent or an electromagnetic arrangement in order to induce magnetic coupling between the components. Although numerous magnetic coupling arrangements have been proposed heretofore, these arrangements for the most part are unable to withstand the application of sufficient driving torque as to render these prior magnetic couplings useful in many of the aforesaid applications. This defect is augmented particularly in those arrangements subjected to high pressures wherein a pressurized container or barrier necessitates a relatively large separation between the driving and driven components of the magnetic coupling.

In view of the foregoing, this invention contemplates a novel and efficient magnetic coupling arrangement.

Another object of the invention is the provision of a magnetic coupling having a minimum of component parts and adapted for application of relatively high torque without loss of synchronism between the driving and driven components of the coupling.

A further object of the invention is the provision of a magnetic coupling arrangement wherein a novel magnetic pole arrangement is employed.

Still another object of the invention is to provide a magnetic coupling with novel means for facilitating magnetic fluxile paths between the driving and driven components thereof.

A still further object of the invention is to furnish a novel magnetic coupling arrangement which is capable of operating with a relatively thick, sealed enclosure inserted between the driving and driven components thereof.

Yet another object of the invention is the provision of a magnetic coupling adapted for the use of permanent magnets but equally adaptable for employment of an electromagnetic arrangement, if desired.

These and other objects, features, and advantages of the invention will be exemplified more fully during the forthcoming description of an illustrative form of the invention, with the description being taken in conjunction with the accompanying drawings, wherein:

FIGURE 1, comprising FIG. 1A and FIG. 1B, is a longitudinal view, partially in section, of one form of a magnetic coupling arrangement assembled in accordance with the present invention;

FIG. 2 is a cross sectional view taken along reference lines II—II of FIG. 1; and FIG. 3 is a partial cross sectional view taken along reference lines III—III of FIG. 1.

In accordance with the invention a driven component or rotor is adapted for sealing within an enclosed or hermetically sealed housing and is arranged for rotation under the influence of a rotating field which is applied externally of the housing. In one form of the invention the rotating field is made up of a plurality of permanent magnets which are assembled upon a suitable clamping or supporting means, which in turn is mounted for rotation upon the exterior surface of the rotor housing. The permanent magnets are secured preferably about the housing, and the securing means for the magnets serve in addition as pole extensions of the magnets in a manner presently to be described. Because of the novel arrangement of these magnets and pole pieces, a considerable amount of torque can be applied to the magnetic coupling without disrupting the synchronism between the driving and driven components thereof. It will be obvious as this description proceeds that the permanent magnets employed herein can be replaced by electromagnets of suitable shape and design.

Referring now more particularly to the drawings, the illustrative form of invention exemplified therein comprises a magnetic coupling arrangement indicated generally by the reference character 20, the rotating field structure 22 of which is adapted to be rotated in this example at a relative slow speed by a suitable driving mechanism, for an example, an electric motor 24. The motor 24 is coupled to a reduction gearing arrangement indicated generally by the reference character 26, through a conventional and mechanical coupling 28. The reduction gearing arrangement 26 in turn is coupled to the rotating field structure 22 through another conventional coupling denoted generally by the reference character 28. In furtherance of this purpose the field structure 22 is secured to and is supported by a driving shaft 30 by means of a bell-shaped bracket 32. The driving shaft 30 is mounted for rotation within a supporting bracket 34 through the use of suitable antifrictional means, for example the ball-bearing arrangement 36. The supporting bracket 34, together with the electric motor 24 and the reduction gearing arrangement 26, is secured to a suitable bed or base member 38 with the use of various mounting bolts as indicated in the drawings.

The bell-shaped bracket 32 in this example is secured to an annular bearing housing 40 by means of a plurality of mounting bolts, one of which is denoted by the reference character 42. The bearing housing 40 in turn is mounted upon a spacing ring 44 through the use of additional mounting bolts 46. The bell bracket 32, the bearing housing 40 and the spacing ring 44 are mounted for rotation upon a sealed rotor enclosure 48. In furtherance of this purpose, suitable antifrictional means, for an example, a ball-bearing arrangement 50, is mounted between the bearing housing 40 and a tubular extension 52 of the rotor enclosure 48. The outer race 54 of the ball bearing 50 is secured between the spacing ring 44 and an inwardly extending shoulder 56 provided at the inner periphery of the bearing housing 40. On the other hand, the inner race 58 of the ball bearing 50 is secured against an outwardly extending shoulder 60 formed upon the outer surface of the rotor housing extension 52. When thus positioned, the inner race 58 is secured against the shoulder 60 by means of an annular locking nut 62 and a lockwasher 64. The inner periphery of the locking nut 62 is tapped or threaded as is the adjacent outer periphery of the tubular housing extension 52.

To the spacing ring 44 a tubular supporting sleeve 66 is secured, desirably in a coaxial relationship, by means of a plurality of cap screws, with one of the screws being denoted by the reference character 68. The supporting sleeve 66 is furnished for the purpose of supporting the field magnet arrangement presently to be described and is rotatably mounted adjacent its other end upon suitable antifrictional means, for an example, the ball bearing 70, likewise secured to the rotor enclosure 48. For purposes hereinafter elaborated upon, the supporting sleeve 66 extends substantially along the entire length of the driven component or rotor 72 of the magnetic coupling. The outer race 74 of the ball bearing 70 is secured between one end of a plurality of field magnet clamping members 76 presently to be described and a bearing retaining ring 78. The bearing ring 78 is secured to the outward end 80 of the supporting sleeve 66, that is to say the end of the supporting sleeve which is remote from the driving shaft 30, by means of a plurality of mounting screws 82. The inner race 84 of the ball bearing 70 is slidably mounted upon the exterior surface of the rotor enclosure 48. With this arrangement then, it will be seen readily that the rotating field structure 22 can be removed easily from the rotor enclosure 48 by removing the annular locking nut 62 and the associated lockwasher 64 from the tubular housing extension 52 and thereafter withdrawing the field structure 20 including the ball bearings 50 and 70 from the rotor housing 48.

To the inner periphery of the supporting sleeve 66 are secured the plurality of clamping members 76 which, as indicated heretofore, abut against the spacing ring 44 at one end thereof and against the outer race 74 of the ball bearing 70 at their opposite ends. These clamping members, with four being utilized in this example of the invention are secured to the supporting sleeve 66 by means of individual mounting screws 86. As better shown in FIG. 3 of the drawings, the clamping members 76 are furnished with an inverted T-shaped configuration, in which an arcuate surface is imparted to the inward surface of cross portion of the T-shaped configuration in order that a relatively close rotating fit is formed between the clamping members 76 and the outer periphery of the cylindrical rotor enclosure 48. As will be explained more fully hereinafter, this configuration facilitates the flow of magnetic flux between the rotating field structure 22 and the rotor 72. The clamping members 76 desirably are fabricated from carbon steel, or other magnetic material of good permeability, and in this example are not permanently magnetized.

A like plurality of permanent field magnets 88 (FIGS. 2 and 3) are inserted individually between the clamping members 76. The permanent magnets 88 are substantially of the same length as the clamping members 76 and thus are of about the same length as the salient magnetic rotor poles 104 which will be described later in greater detail. In this example of the invention, four such field magnets 88 are employed, but it will be obvious that a greater or lesser number of field magnets 88 and of clamping members 76 can be employed in accordance with the invention. Desirably the field magnets 88 are of transversely arcuate configuration and thus fit relatively closely against the inner periphery of the supporting sleeve 66. The supporting sleeve, of course, is fabricated from a non-magnetic material, for an example stainless steel, in order to avoid short circuiting the flexile paths of the permanent field magnets 88.

The lateral edges of each field magnet 88 are shaped to abut against the stem 90 of the clamping members 76. Since a pair of the confronting opposed side surfaces 91 of adjacent clamping members 76, respectively, are convergent inwardly, the abutment of the field magnets 88 therewith limits inward movement of each of the field magnets. Outward movement of the magnets 88 is limited either by the supporting sleeve 66, or, for ease in assembly and disassembly of the field structure 22, by a plurality of complementary longitudinally spaced clamping elements 92 each of which is likewise T-shaped in cross section and is secured to the clamping member 76 by means of individual mounting bolts 94. The cross arms or shoulders 96 of each complementary clamping element 92 engage the opposing bevelled or tapered surfaces 98 of the adjacent pair of field magnets 88. Upon tightening the mounting bolt 94 employed with each of the complementary clamping elements 92, the adjacent field magnets 88 are secured between the aforesaid opposing surfaces 91 (FIG. 2) of the clamping members 76 and the shoulders 96 of the complementary clamping elements 92. In this arrangement a complementary clamping element 92 is employed adjacent each end of the field magnets 88, whereby a total of eight such complementary clamping elements are utilized. With this arrangement each of the field magnets 88 is securely mounted in the rotating field structure 22 at a position which is substantially coaxial with that of the rotor 72 throughout the length of the field magnet.

In this example, each of the field magnets 88 is permanently magnetized in a manner such that its lateral edges 100 and 102 are north and south poles respectively. In this arrangement then, the opposing lateral edges 100 or 102 of adjacent field magnets 88 are of the same polarity, as indicated more fully in FIG. 2 of the drawings. Consequently, each clamping member 76, which is formed as aforesaid from a non-magnetized magnetic material, assumes the same magnetic polarity as that of the adjoining lateral edges of adjacent field magnets 88 and thereby serves as a pole extension of each pair of these opposing lateral edges. Accordingly, the four clamping members 76 form alternating north and south poles, respectively, of the rotating field structure 22. These pole extensions, then, are spaced equidistantly about the housing 48 of the rotor 72.

In those applications wherein the rotor 72 is employed within a highly pressurized sealed system the rotor housing 48, which communicates with the system, is formed with a thickness sufficient to withstand the operating pressures developed within the system. In the case of highly pressurized systems wherein the rotor enclosure 48 is, of course, relatively thick, the enclosure desirably is fabricated from a semi-magnetic material, that is one of low or intermediate permeability, such as hardened 410 stainless steel having 11½ to 13½% chromium. This material will avoid any substantial circumferential short circuiting magnetic flux between adjacent field pole extensions or clamping members 76 and yet will permit adequate flow of magnetic flux through the rotor enclosure 48 in a radial direction, that is to say, between the clamping members 76 and the rotor poles 104 as explained subsequently. Suitable semi-magnetic enclosures are described and claimed in a copending application of W. E. McCown entitled "Electric Motor Device," Serial No. 496,832, filed March 25, 1955, and assigned to the present assignee.

In this arrangement the rotor 72 is provided with four salient magnetic poles 104 extending longitudinally thereof. The rotor poles 104 are equivalent in number to the field pole extensions or clamping members 76, but, of course, a greater or lesser number of rotor poles can be utilized depending upon the number of field magnets and associated components utilized in the field structure 22.

The rotor poles 104 in this example are formed integrally with a rotor sleeve member 106 which in turn is keyed to a tubular rotor shaft 108 by means of end keys 110. The rotor sleeve member 106 together with the salient poles 104 are fabricated from a magnetic material such as carbon steel but need not be permanently magnetized, in this example of the invention. On the other hand, in those applications wherein the rotor 72 is immersed within a corrosive fluid, the sleeve member 106 and the salient poles 104 can be fabricated from a magnetic stainless steel which desirably has been annealed to enhance its magnetic properties. To the tubular rotor shaft 108, which need not be necessarily fabricated from a magnetic material, is secured a shaft extension 112 by means of mounting bolts 114 inserted through suitable apertures 116 in a flanged portion 118 of the shaft extension and threaded into the outward end of the tubular rotor shaft 108.

The rotor 72 is mounted for coaxial rotation within the housing 48 by suitable antifrictional means, for example the ball bearings 120 and 122. The outer race 124 of the ball bearing 120 forms a relatively close fit with a raised surface portion 126 of the inner periphery of the enclosure 48, while the inner race 128 of the bearing 120 is secured by an annular locking nut 130 and lockwasher 132. The locking nut 130 is threaded upon the inner end of the tubular rotor shaft 108, and the inner race 128 of the bearing 120 is clamped between the locking nut and a spacing ring 134 inserted between the inner race 128 and the rotor sleeve 106.

Adjacent the opposite end of the rotor 72, outer race 135 of the bearing 122 is clamped between an inwardly extending shoulder 136 formed on the inner periphery of the rotor enclosure 48 and the inward end 138 of a rotor enclosure extension 140. The inner race 142 on the other hand is clamped between a bearing retaining ring 144 and an outwardly extending shoulder 146 formed adjacent the outward end of the tubular rotor shaft 108. In this manner then the inner race 142 of the bearing 122, the bearing retaining sleeve 144, the rotor sleeve 106, the spacing ring 134, and the inner race 128 of the bearing 120 are clamped together in tandem along the length of the tubular rotor shaft 108 between the aforementioned shoulder 146 and the annular locking nut 130.

The rotor enclosure extension 140, which can communicate with a sealed system (not shown) as desired, is secured to a thickened outer end portion 148 of the rotor enclosure 48 by means of a plurality of cap screws 150 which are threadedly engaged with the end portion 148 and inserted through suitable apertures of an outwardly extending flange 152 secured to the housing extension 140. With this arrangement then, it will be apparent that the rotor 72 together with its component parts can be completely removed from the housing 48 simply by removing the enclosure extension 140 and withdrawing the rotor 72 longitudinally from the enclosure 48. Similarly, the component parts of the rotor 72 can be easily disassembled upon removing the annular locking nut 130. In applications involving extremely hazardous fluids wherein a zero leakage must be ensured, the housing extension 140 can be hermetically sealed to the rotor housing 48 through use of the sealing means disclosed and claimed in a copending application of E. J. Kreh and C. M. Ladd entitled "Weld Container," filed November 17, 1953, now Patent 2,805,789, issued September 10, 1957, and assigned to the present assignee.

In the operation of the invention, the permanent field magnets 88 establish lines of magnetic flux through the field structure including the pole extensions or clamping members 76, the salient poles 104, and the rotor sleeve 106 as indicated by the series of arrows 154 (FIG. 2). Moreover, the fluxile paths designated by each series of arrows 154 extend substantially the entire length of the salient rotor poles 104 as indicated by arrows 156 (FIG. 1). It has been found that this arrangement of rotor and field poles including the field pole extensions 76 permits application of a relatively large torque to the components of the magnetic coupling 20, namely the rotor 72 and the field structure 22, without loss of synchronism between these components.

In view of the foregoing it will be apparent that a novel and efficient magnetic coupling arrangement has been exemplified herein. The descriptive matter employed herein has been utilized solely for delineating the invention and therefore should not be interpreted as limitative in nature. It will be obvious, then, that numerous modifications of the invention will occur to those skilled in the art without departing from the spirit and scope of the invention. Accordingly, what is claimed as new is:

1. A magnetic coupling comprising an elongated driven member having a plurality of salient magnetic poles extending longitudinally along the length thereof, a driving member having a plurality of elongated magnets mounted in spaced relation to said driven member and to each other, said magnets extending substantially along the length of said driven member and having north and south magnetic poles disposed at their longitudinal edges respectively, said longitudinal edges being juxtaposable to the salient poles of said driven member and a semi-magnetic enclosure disposed between said members and enclosing said driven member.

2. A magnetic coupling comprising an elongated driven member and an elongated driving member, said driven member having a plurality of salient magnetic poles extending longitudinally thereof, said driving member having a plurality of magnets extending longitudinally thereof and in spaced relation to said driven member, each of said magnets having north and south poles disposed at opposite edges thereof respectively, with the opposing edges of adjacent magnets being of the same polarity, said magnets being arranged in a generally circular array about said driven member, magnetic clamping means secured to each pair of said opposing edges, and a magnetic pole extension secured to each said clamping means and extending to a position of juxtaposable relation to said salient magnetic poles and a semi-magnetic enclosure disposed between said members and enclosing said driven member.

3. A magnetic coupling comprising a driven component and a driving component, said driven component having a plurality of outwardly extending salient magnetic poles secured longitudinally thereof, and said driving component having a plurality of magnets extending longitudinally thereof and spaced outwardly of said driven component in a generally circular array and arranged substantially coaxial of said driven component, each of said magnets having a north and a south pole disposed at its lateral edges, respectively, with the opposing lateral edges of adjacent magnets being of the same polarity, a magnetic clamping means secured to each pair of said opposing lateral edges, and a magnetic pole extension secured to each of said clamping means and extending inwardly to a position of juxtaposable relation to the salient poles of said driven component and a semi-magnetic enclosure disposed between said components and enclosing said driven component.

4. A magnetic coupling adapted for use in conjunction with the sealed system, said coupling comprising an elongated driven component; an elongated driving component; a housing surrounding said driven component, said driving component being mounted outwardly of said housing; a plurality of salient magnetic poles located on the outward surface of said driven component and extending longitudinally thereof; a plurality of inwardly extending magnetic pole extensions secured to said driving component, each of said salient poles and said pole extensions being closely spaced from the inner and outer peripheries, respectively, of said housing; and a plurality of elongated magnets secured individually between adjacent pairs of said pole extensions, each of said magnets having a north pole and a south pole disposed at its longitudinal edges, respectively, with the opposing longitudinal edges of adjacent magnets being of the same polarity, and said housing being formed from a semi-magnetic material which limits short circuiting of the magnetic flux along a closed path formed by said housing.

5. A magnetic coupling adapted for use in conjunction with a sealed system, said coupling comprising an elongated driving member and a driven member; a housing separating said members, said driven member having a plurality of salient magnetic poles extending longitudinally thereof, said driving member having a plurality of elongated magnets mounted in spaced relation adjacent said driven member and extending along the length thereof, each of said magnets having a north and a south pole disposed at its longitudinal edges, respectively, with the opposing longitudinal edges of adjacent magnets being of the same polarity and mounted in juxtaposable relation to said salient poles, each of said magnets and said salient poles being closely spaced from an adjacent wall surface of said housing, said housing being formed from a semi-magnetic material which limits short circuiting of the magnetic flux along a closed path formed by said housing.

6. A magnetic coupling suitable for use in a sealed system, said coupling comprising a tubular housing, a driven member disposed within said housing and having axially extending salient poles disposed thereon, a driving member surrounding an axial portion of said housing and juxtaposed to said driven member, said driving member including an array of magnets surrounding said housing portion, each magnet having its poles extending in the axial direction with adjacent poles of adjacent magnets being of like polarity, said housing being formed from a semi-magnetic material which limits short circuiting of the magnetic flux along a closed path formed by said housing.

References Cited in the file of this patent

UNITED STATES PATENTS

| | | |
|---|---|---|
| 1,298,465 | Dean | Mar. 25, 1919 |
| 1,308,435 | Maire | July 1, 1919 |
| 2,683,826 | Staak | July 13, 1954 |

FOREIGN PATENTS

| | | |
|---|---|---|
| 181,348 | Switzerland | Feb. 17, 1936 |
| 909,472 | Germany | Apr. 22, 1954 |
| 1,137,162 | France | Jan. 5, 1957 |